United States Patent [19]
Blincow et al.

[11] Patent Number: 5,371,137
[45] Date of Patent: Dec. 6, 1994

[54] EMULSION POLYMERIZATION

[75] Inventors: Philip J. Blincow, London, England; Michael T. Sarkis, Manville, N.J.

[73] Assignee: National Starch and Chemical Investment Holding Corporation, Wilmington, Del.

[21] Appl. No.: 936,710

[22] Filed: Aug. 27, 1992

[30] Foreign Application Priority Data

Aug. 28, 1991 [DE] Germany .............. 91307850
Jun. 30, 1992 [GB] United Kingdom ....... 9214027.6

[51] Int. Cl.$^5$ ............................. C08L 31/02
[52] U.S. Cl. ............... 524/564; 524/563; 526/331
[58] Field of Search ............ 524/564, 563; 526/331

[56] References Cited

U.S. PATENT DOCUMENTS

| | | | |
|---|---|---|---|
| 4,521,561 | 6/1985 | Hausman et al. | 524/459 |
| 4,911,960 | 3/1990 | Mudge et al. | 428/34.3 |
| 4,939,220 | 7/1990 | Mudge | 526/318.43 |
| 4,997,879 | 3/1991 | Weissgerber et al. | 524/823 |

FOREIGN PATENT DOCUMENTS

1745565 10/1971 Germany .
1402777 8/1975 United Kingdom .

OTHER PUBLICATIONS

Chemical Abstracts, vol. 87, No. 26, Dec. 26, 1977, Columbus, Ohio, US: Abstract No. 202525, "Pressure-Sensitive Adhesive Compositions", p. 26, col. 2; JP-A-7747833 (Showa Highpolymer Co. Ltd.).

*Primary Examiner*—Paul R. Michl
*Assistant Examiner*—John J. Guarriello
*Attorney, Agent, or Firm*—Ellen T. Dec

[57] ABSTRACT

Vinyl $C_1$ to $C_3$ alkanoate/$C_2$ to $C_4$ alkylene copolymer emulsions e.g. vinyl acetate/ethylene, are usable as wet adhesives and pressure sensitive adhesives for a number of applications. Their bonding to the surfaces of lower polarity, e.g. polyethylene, is improved by including vinyl esters of $C_4$ to $C_{18}$ primary carboxylic acids as a monomer.

3 Claims, No Drawings

EMULSION POLYMERIZATION

FIELD OF THE INVENTION

This invention relates to copolymer emulsions for use in adhesive for packaging, flooring and automotive applications and for use as pressure sensitive adhesives. It is of special value for relatively non-polar substrates, e.g. polypropylene.

BACKGROUND OF THE INVENTION

The variety of substrates that emulsion adhesives are required to bond is extending, for example to bond polypropylene, polyethylene and polyester films in the packaging industry. There is a general requirement for emulsion adhesives to exhibit improved properties on non-polar, difficult to stick substrates. Improvements would be enhanced adhesion, cohesion, heat resistance and use without additional plasticizer.

Pressure sensitive adhesives provide immediate adhesion between surfaces placed in contact and subject to pressure, usually the latter is low and can be applied manually. Adhesives of this class are capable of providing adhesion to a surface without the necessity of activation by heat or solvents and have sufficient internal cohesion to ensure the layer of adhesive material does not rupture before the adhesive/surface bond. The ability to give immediate adhesion is usually expressed as "tackiness" and it is normally desirable to obtain as much tackiness as possible without losing any substantially amount of cohesion, is internal strength.

The use of the above adhesives occurs in a wide range of industries, e.g. flooring, packaging, laminates, tapes and labels, but there is a general requirement to improve the properties of such adhesives to allow their use with the more non-polar surfaces. These are exemplified by the polymers polypropylene, and polyethylene.

GENERAL DESCRIPTION OF THE INVENTION

The copolymer emulsions of the present invention, while being of value as adhesives for a range of surfaces, are of particular value for adhesion to surfaces having relatively low polarity. The copolymer emulsions of the present invention are characterized by containing vinyl esters of $C_4$ to $C_{18}$ secondary or primary carboxylic acids.

The copolymers have a Tg of about +10° C. to about −65° C. and comprise, in the copolymer solids, by weight, i) from about 5% to about 85% vinyl $C_1$ to $C_3$ alkanoate, ii) from about 10% to about 50% of $C_2$ to $C_4$ alkylene, and iii) from about 5% to about 85% of vinyl esters of $C_4$ to $C_{18}$ primary or secondary carboxylic acids having the formula

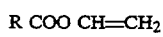  a)

wherein R is a straight chain alkyl group having 3 to 17 carbon atoms, preferably 5 to 14 carbon atoms, or

  b)

wherein $R^1$ and $R^2$ are each a straight chain alkyl group having 1 to 15 carbon atoms, preferably with $R^1$ having from 5 to 14 carbon atoms and $R^2$ having 1 to 6 carbon atoms.

The copolymer solids content of the emulsion will preferably be in the range about 50% to about 65% by weight, preferably from about 54% to about 61% by weight. In this range an effective adhesion is obtained using standard preparative methods. The copolymer emulsion adhesives of the invention are usable as wet adhesives, i.e. applied and bonded as a wet coating, or as a dry pressure sensitive coating, i.e. dried before bonding.

The vinyl esters of carboxylic acids (iii) have good reactivity with ethylene, as an example of an alkylene, and thus relatively high values or ethylene can be incorporated.

Vinyl acetate is the preferred vinyl alkanoate because of cost, availability and reaction properties but other members of the class, e.g. vinyl formate, and propionate are usable.

The preferred alkylene monomer is ethylene but other ethylenic hydrocarbons, for example, propylene, butylene and isobutene can be used.

Examples of the vinyl esters of carboxylic acids of formulae (a) and (b) are vinyl 2-ethyl hexanoate, vinyl butanoate, valerate, octanoate, nonanoate, decanoate, caprioate and laurate.

Optionally the copolymer may contain minor monomer components added to provide specific benefits; these monomers would be present at levels below 10% by weight in the copolymers solids. Examples of these monomers are sodium vinyl sulphonate, crotonic acid, acrylic acid, methacrylic acid, acrylamide, hydroxy functional acrylates, vinyl silanes, vinyl halides and polyethylenically unsaturated compounds, e.g. triallyl cyanurate, triallyl isocyanurate, diallyl maleate, diallyl fumarate, divinyl benzene, diallyl phthalate and N-methylolacrylamide.

The preferred ranges of the monomers will be selected to give the appropriate Tg and properties for each application.

For a packaging adhesive the Tg is preferably selected to be in the range from about 0° C. to −30° C. by the use of appropriate quantities of monomers. For this application the preferred monomer composition is, by weight:

i) about 45% to about 75% vinyl alkanoate ii) about 15% to about 30% of alkylene, and iii) about 10% to about 25% of monomer (iii), preferably vinyl 2-ethyl hexanoate For a pressure sensitive adhesive the Tg is preferably selected to be in the range from about −20° C. to about −50° C. by the use of appropriate quantities of monomers. For this application the preferred monomer composition is, by weight:

i) from about 20% to about 55% of vinyl alkanoate ii) from about 10% to about 40%, preferably 15 to 25%, of alkylene, and iii) from about 20% to about 50%, preferably 30 to 40%, of monomer (iii), preferably vinyl 2-ethyl hexanoate The Tg quoted is the effective Tg and is selected to give an adhesive appropriate for the surfaces to be adhered.

The conventional features in the preparation of the copolymer emulsions of the invention are well characterized in the literature. Polymer Synthesis (Vols I and II) by Sandler & Karo (Academic Press 1974) and Preparative Methods of Polymer Chemistry (2nd Ed) by Sorenson & Campbell (Interscience 1968) provide preparative information. Methoden der Organischen Chemie (Houben-Weyl) Band XIV published by Georg Thieme Verlag Stuttgart (1961) also provides preparative descriptions.

In accordance with the procedure utilized herein the monomers are polymerized in an aqueous medium under pressures not exceeding 100 atmospheres in the presence of a catalyst and at least one emulsifying agent, the aqueous system being maintained by a suitable buffering agent at a pH of 2 to 6, the catalyst being added incrementally or continuously. More specifically, the vinyl alkanoate and 50 to 75% of the monomer (iii) are suspended in water and are thoroughly agitated in the presence of ethylene under the working pressure to effect solution of the ethylene in vinyl alkanoate and monomer (iii) up to the substantial limit of its solubility under the condition existing in the reaction zone, while the vinyl alkanoate and monomer (iii) are gradually heated to polymerization temperature. The homogenization period is followed by a polymerization period during which the catalyst, which consists of a main catalyst or initiator, and may include an activator, is added incrementally or continuously together with the remaining monomers. The monomers employed may be added either as pure monomer or as a premixed emulsion.

Suitable as polymerization catalysts are the water-soluble free-radical-formers generally used in emulsion polymerization, such as hydrogen peroxide, sodium persulfate, potassium persulfate and ammonium persulfate, as well as tert-butyl hydroperoxide, in amounts of between 0.01 and 3% by weight, preferably 0.01 and 1% by weight based on the total amount of the emulsion they can be used alone or together with reducing agents such as sodium formaldehyde-sulfoxylate, ferrous salts, sodium dithionite, sodium hydrogen sulfite, sodium sulfite, sodium thiosulfate and ascorbic acid, as redox catalysts in amounts of 0.01 to 3% by weight, preferably 0.01 to 1% by weight, based on the total amount of the emulsion. The free-radical-formers can be charged in the aqueous emulsifier solution or be added during polymerization in doses.

The polymerization is carried out at a pH of between 2 and 7, preferably between 3 and 5. In order to maintain the pH range, it may be useful to work in the presence of alkali metal acetate, metal carbonates, alkali metal phosphates. Polymerization regulators, like mercaptans, aldehydes, chloroform, ethylene chloride and trichloroethylene, can also be added in some cases.

The emulsifying agents are those generally used in emulsion polymerization, as well as optionally present protective colloids. It is also possible to use emulsifiers alone or in mixtures with protective colloids.

The emulsifiers can be anionic, cationic, nonionic surface-active compounds or mixtures thereof. Suitable anionic emulsifiers are, for example, alkyl sulfonates, alkylaryl sulfonates, alkyl sulfates, sulfates or hydroxyalkanols, alkyl and alkylaryl disulfonates, sulfonated fatty acids, sulfates and phosphates of polyethoxylated alkanols and alkylphenols, as well as ester of sulfosuccinic acid. Suitable cationic emulsifiers are, for example, alkyl quaternary ammonium salts, and alkyl quarternary phosphonium salts. Examples of suitable non-ionic emulsifiers are the addition products of 3 to 100 mols of ethylene oxide adducted to straight-chain and branch-chain alkanols with 6 to 22 carbon atoms, or alkylphenols, or higher fatty acids, or higher fatty acid amides, or primary and secondary higher alkyl amines; as well as block copolymers of propylene oxide with ethylene oxide and mixtures thereof. When combinations of emulsifying agent is generally from about 2 to about 8, weight percent of the monomers used in the polymerization.

The emulsifier used in the polymerization can also be added, in its entirety, to the initial charge to the polymerization zone or a portion of the emulsifier, e.g. from 90 to 25 percent thereof, can be added continuously or intermittently during polymerization.

Various protective colloids may also be used in place of or in addition to the emulsifiers described above. Suitable colloids include partially acetylated polyvinyl alcohol, e.g., up to 50 percent acetylated, casein, hydroxyethyl starch, carboxymethyl cellulose, hydroxyethyl cellulose, gum arabic, and the like, as shown in the art of synthetic emulsion polymer technology. In general, these colloids are used at levels of 0.05 to 4% by weight based on the total emulsion.

The process of making the polymers of the invention generally comprises the preparation of an aqueous solution containing at least some of the emulsifying agent and stabilizer, and the pH buffering system. This aqueous solution and the initial monomer charge are added to the polymerization vessel and ethylene pressure is applied to the desired value. The quantity of ethylene entering into the copolymer is influenced by the pressure, the agitation, and the viscosity of the polymerization medium. Thus, to increase the ethylene content of the copolymer, higher pressures are employed. A pressure range of about 10 to 100 atmospheres or bars is most suitably employed. As previously mentioned, the mixture is agitated to dissolve the ethylene, agitation being continued until substantial equilibrium is achieved. This generally requires about 15 minutes. When high ethylene contents are desired, a higher degree of agitation should be employed. In any case, by measuring the pressure drop of the ethylene in conventional manner, the realization of substantial equilibrium can be easily determined. Conveniently the charge is brought to polymerization temperature during this agitation period. Agitation can be effected by shaking, by means of an agitator, or other known mechanism. The polymerization is then initiated by introducing initial amounts of the catalyst, and of the activator when used. After polymerization has started, the catalyst and the activator are incrementally added as required to continue polymerization, and the remaining monomers and any minor functional monomers are similarly added.

The polymerization reaction is generally continued until the residual vinyl ester monomer content is below about 1%. The completed reaction product is then allowed to cool to about room temperature, while sealed from the atmosphere.

The copolymer emulsions of the present invention can be blended with other components e.g. tackifiers, plasticizers, fillers and solvents.

SPECIFIC DESCRIPTION OF THE INVENTION

Examples of copolymer emulsions of the invention and their application in adhesives will now be given to illustrate but not limit the invention.

EXAMPLE I

This example describes a VA/E/V2EH terpolymer. The polymer was produced from a monomer composition of:

| vinyl acetate | 839 g | (45%) |
| --- | --- | --- |
| ethylene | 559 g | (30%) |
| vinyl-2-ethyl hexanoate | 466 g | (25%) |

An aqueous solution with the composition listed below was prepared and loaded into a stirred pressure reactor (3.7 L capacity).

| anionic surfactant* (8% aqueous) | 32.0 g |
| --- | --- |
| polyvinyl alcohol+ | 39.3 g |
| ferric chloride | 0.01 g |
| sodium formaldehyde sulphoxylate (2H$_2$O) | 0.60 g |
| formic acid to give pH 3.0 to 3.5 | |
| water to give non volatile content of 56.9% of final product. | |

*obtained from Harcros Chemicals UK Ltd., Manchester, England, under the tradename Perlankrol PA (conc). This is an ammonium salt of an alkyl phenol ether sulphate.
+obtained from Nippon Gohsei, Osaka, Japan, under the tradename Gohsenol GL05. This is an 88% hydrolyzed polyvinyl alcohol of 4% aqueous solution. Viscosity 5 cps.

The reactor was first flushed with nitrogen and then ethylene. The agitator was then started, the vessels contents heated to 30° C., and part of the ethylene component added to the vessel to give a pressure of 54 bar.

50% of the vinyl acetate and 32% of the vinyl-2-ethyl hexanoate were added at this stage to form an initial monomer charge.

Initiator solutions having compositions A and B had been prepared:

| A | Sodium persulfate | 13.6 g |
| --- | --- | --- |
| | Sodium bicarbonate | 6.1 g |
| | Water | 325.0 g |
| B | Sodium formaldehyde sulphoxylate (2H$_2$O) | 5.3 g |
| | Water | 326 g |

When the first stage monomer had been completely added, the continuous additions of the initiator containing solutions were added together with the remainder of the monomers.

A mixture of the remaining vinyl acetate and vinyl-2-ethyl hexanoate was added over a period of 6 hours. The initiator solutions were added over 7 hours with the first 15 minutes and last hour at double rate of addition.

Once the reaction had begun the internal temperature was raised to 50° C. over 1 hour. After 1 hour, ethylene was added to maintain a pressure of 50 bar until 5 hours into the reaction.

When the addition of monomers vinyl acetate and vinyl-2-ethyl hexanoate was complete the internal temperature was raised to 60° C. and maintained until the end of initiator solution additions.

When the additions were complete the reactor contents were cooled to 30° C. while adding final stage initiator solutions C and D over a period of 30 minutes:

| C | t-butyl hydroperoxide | 6.6 g |
| --- | --- | --- |
| | Sodium bicarbonate | 6.1 g |
| | Water | 54 g |
| D | Sodium metabisulphite | 2.6 g |
| | Water | 54 g |

At ambient temperature 3.3 g of preservative was added.

The emulsion was coated, without the addition of plasticizer, at 0.1 mm thick wet film thickness onto paper samples. The coating was then laminated wet onto the following difficult to stick substrates:
acrylic lacquer board
UV lacquer board
polypropylene film
polyester film
aluminum foil
aluminized foil
PVC sheet After drying for 18 hours in all cases excellent adhesion was obtained and delamination tests gave paper failure in each case. Thus the adhesive layer has good cohesion.

The emulsion was laminated wet at 0.1 mm film thickness between paper sheets and dried for 18 hours. A 10 mm strip of the laminate then withstands delamination under a 100 g load up to 64° C. This is a relatively high heat resistance for this type of adhesive.

The emulsion when coated onto 50 μm polyester sheet at dry coat weight of 18–22 gsm, after drying for 5 minutes at 105° C., gave the following properties:
i) peel adhesion, after 20 minutes bed-down, for a 25 mm wide strip on stainless steel at 25° C. of 770 g.
ii) final loop tack adhesion to glass of 1160 g
iii) shear cohesion at 1.8 kg/square inch load and 25° C. of 58 hours.

EXAMPLE II

A copolymer emulsion was prepared using the process of Example I but with the monomer proportions by wt % of:

| vinyl acetate | 47% |
| --- | --- |
| ethylene | 35% |
| vinyl-2 ethyl hexanoate | 18% |

This emulsion used as a pressure sensitive adhesive had the properties:

| peel adhesion | 613 g |
| --- | --- |
| final loop tack | 590 g |
| shear cohesion | 51 hours |

EXAMPLE III

A copolymer emulsion of the invention was prepared using vinyl laurate as the vinyl ester (iii). A copolymer emulsion having the monomer composition, by weight, of:

| vinyl acetate | 45% |
| --- | --- |
| ethylene | 30% |
| vinyl laurate | 25% |

This emulsion had a Tg of −33° C. and a solids content of 54.6% weight. It was subjected to a number of tests and the results are given in Table I.

EXAMPLE IV

In order to demonstrate the advantage of using vinyl 2-ethyl hexanoate in a VA/E pressure sensitive adhesive a comparison was made between the copolymer emulsion of Example I (Example IV A) and an emulsion, preparing using the Example I procedure, containing a copolymer of vinyl acetate 55%/ethylene 45% (Example IV B).

The properties of these emulsions are given in Table I. Example IV A is seen to have properties comparable to the Example I material, i.e. a Tg of −26° C. and a solids content of 56.2%. Example IV B had a Tg of −24° C. and a solids content of 53.9%.

TABLE I

| | ADHESION APPLIED WET PAPER-OPP | | PEEL ADHESION (g) | | | LOOP TACK (g) | | | SHEAR COHESION (HRS) | HEAT RESISTANCE |
|---|---|---|---|---|---|---|---|---|---|---|
| | MODE OF FAILURE | MAX (g) | OPP | PE | SS | OPP | PE | SS | | |
| Ex III | Immediate paper failure | 647 | 867 | 210 | 850 | 193 | 183 | 1088 | 6 | 35° C. |
| Ex IV A | Immediate paper failure | 575 | 777 | 73 | 820 | 170 | 133 | 1020 | 47 | 66° C. |
| Ex IV B | Adhesion failure to OPP then paper fail | 287 | 100 | 52 | 60 | 72 | 82 | 262 | 49 | 74° C. |

OPP is orientated polypropylene
PE is polyethylene
SS is stainless steel

As the results presented in Table I indicate, a particularly preferred balance of properties, especially increased adhesion to hydrophobic substrates with little or no reduction in cohesive strength, is achieved by the use of the 2-ethyl hexanoate monomer, in accordance with a preferred embodiment of the invention.

We claim:

1. An adhesive emulsion composition having a Tg of about +10° C. to about −65° C. consisting essentially of, in the polymer solids, by weight,
   i) from about 5% to about 85% by weight of vinyl $C_1$ to $C_3$ alkanoate,
   ii) from about 10% to about 50% by weight of $C_2$ to $C_4$ alkylene, and
   iii) from about 5% to about 85% by weight of vinyl 2-ethylhexanoate or vinyl laurate.

2. A composition according to claim 1 containing from about 50% to about 65% by weight of copolymer solids.

3. A composition according to claim 2 containing from about 54% to about 61% by weight of copolymer solids.

* * * * *